3,706,051
LIQUID LASER
Franck Collier, Longjumeau, Jean-Daniel Dauchy, Paris, Christian Le Sergent, Sainte-Genevieve-des-Bois, and Maurice Michon, Draveil, France, assignors to Compagnie Generale d'Electricite, Paris, France
Filed Sept. 3, 1971, Ser. No. 177,721
Claims priority, application France, Sept. 4, 1970, 32,265
Int. Cl. H01s 3/20
U.S. Cl. 331—94.5                                   6 Claims

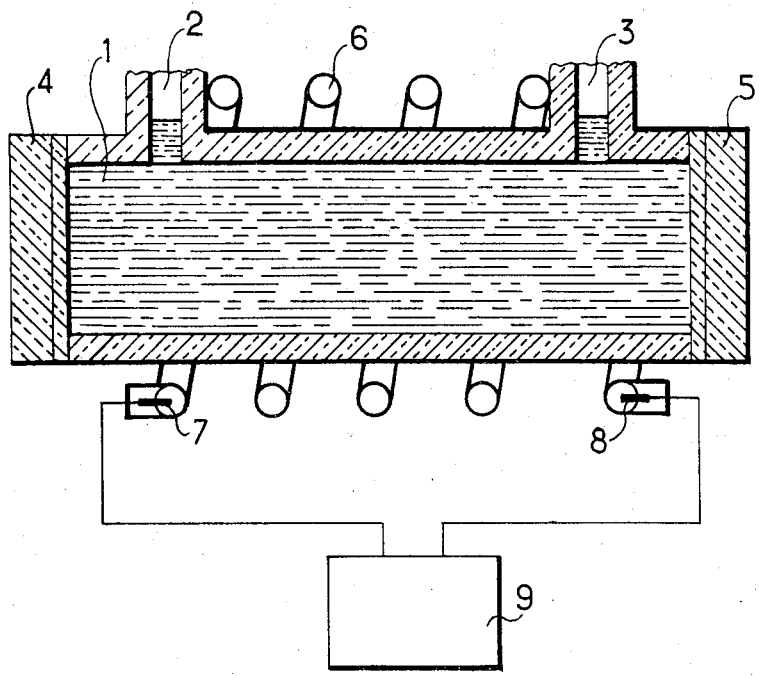

ABSTRACT OF THE DISCLOSURE

A laser generator having a liquid active medium consisting of a solvent comprising products of the hydrolysis of thionyl chloride and of antimony chloride in which a doping medium is dissolved.

BACKGROUND OF THE INVENTION

Field of the invention

The present invention concerns laser generators and more particularly lasers in which the stimulated emission is obtained in a liquid active material.

Description of the prior art

A laser generator comprises, very schematically, an active medium disposed in a Fabry-Perot resonating cavity consisting of two partially reflecting mirrors and a pumping means associated with the active medium.

At present, three kinds of active media are known, i.e. a solid active medium which may be, for example, a ruby crystal or a neodymium-doped glass rod, or again a gaseous active medium such as, for example, a mixture of gas comprising helium and neon, and finally a liquid medium.

The liquid active media at present employed in laser generators generally consist of a doping material such as neodymium or another rare earth, in solution in a solvent.

The known solvents which are at present employed are of various natures. For example, there is employed a mixture of selenium oxychloride ($SeOCl_2$) and tin chloride ($SnCl_4$). Another known solvent consists of a mixture of phosphorus oxychloride ($POCl_3$) and a metallic chloride ($MCl_n$) wherein M may be chosen from the following list of metals: tin, zirconium, boron, titanium. This mixture may also sometimes include water ($H_2O$).

Of course, in these various types of solvents, the active doping agent is dissolved in predetermined proportions. For example, neodymium is dissolved in the form of an oxide ($Nd_2O_3$) in proportions of 10% by weight, this percentage not being critical and being variable within fairly wide limits. Laser generators in which liquid active media such as those described above are employed can operate only in a fairly narrow temperature range, because outside the permitted temperature range, for example, between 10° and 80° C., a precipitation effect is observed, which immediately inhibits all stimulated emission.

SUMMARY OF THE INVENTION

The present invention has for its object to obviate these disadvantages.

The present invention also concerns a laser generator having a liquid active medium which is capable of operating in a wider temperature range than the existing laser generators.

The present invention relates to a laser generator having a liquid active medium consisting of a doping agent in solution in a solvent, characterized by the fact that the said solvent consists of a mixture of the following products: thionyl chloride ($SOCl_2$), antimony chloride ($SbCl_5$) and at least one product of hydrolysis of one of these two products.

BRIEF DESCRIPTION OF THE DRAWING

Further features and advantages of the present invention will become apparent in the course of the following description, which is given with reference to the accompanying illustrative, but non-limiting drawing, of which the single figure is a diagram illustrating the principle of a laser generator having a liquid active medium.

DESCRIPTION OF THE PREFERRED EMBODIMENT

The single figure shows in longitudinal section one form of construction of a laser generator having a liquid active medium. It comprises an enclosure 1, preferably of cylindrical form, which has a fluid inlet 2 and a fluid outlet 3, for example, disposed at either end of the cylinder.

The cylindrical enclosure 1 has its end faces cut perpendicularly to its axis, and bears on these two faces two mirrors 4 and 5, of which at least one has multi-dielectric layers to permit the laser emission to emerge from the Fabry-Perot resonating cavity formed by the two mirrors 4 and 5.

The laser generator also comprises a pumping means for exciting the liquid active medium. This means may be, as diagrammatically illustrated in the figure, a discharge tube 6 helically coiled around the cylindrical enclosure 1, of which the electrodes 7 and 8 are connected to a source 9 by which there can be supplied to the discharge tube 6 sufficient energy to enable the discharge tube to produce a luminous flash, in order to effect an optical pumping of the liquid active laser medium contained in the cylindrical enclosure 1. This energy is generally supplied by the discharge of capacitors.

A liquid laser generator can operate statically or dynamically, i.e., with a fluid which is fixed in the enclosure or with a fluid which is constantly renewed.

By way of example, one of the laser generators employed for the experimentation with the liquid active medium operates statically. The medium consists of a mixture of products of hydrolysis of antimony chloride ($SbCl_5$) and thionyl chloride ($SOCl_2$). There are meant by "products of hydrolysis" any products which can be obtained by reacting one of the latter two bodies with water. This mixture constitutes the solvent in which there is dissolved a doping active medium such as, for example, an oxide of a rare earth such as neodymium ($Nd_2O_3$).

By way of example, the active medium used in the experiment has the following composition in proportions by volume: 65% of antimony chloride to 35% of thionyl chloride. Neodymium oxide is dissolved in the mixture of these two substances so that the neodymium ($Nd^{+++}$) concentration is about 0.1 mole per litre. The active medium contains in addition water in a concentration of 0.6 mole per litre.

Another experiment was carried out in which titanium chloride ($TiCl_4$) was added to the above-defined mixture in order to facilitate the elimination of the residual hydroxide groupings (OH). The mixture of antimony chloride, thionyl chloride and titanium chloride is in similar proportions by volume of 60%, 35% and 5%, the concentration of neodymium ($Nd^{+++}$) and water remaining the same as before.

Laser generators having liquid active media gave just as satisfactory results as are obtained with known laser generators operating with conventional liquid active media, it being found that:

The absorption of this new liquid active medium at a wavelength of 1.06 micron is very low, and the addition of thionyl chloride does not in any way contribute to an increase in this absorption, and The radiative lifetime is just as long, i.e. more than 200 microseconds.

On the other hand, however, and this is one of the main advantages of the invention, the liquid active media according to the invention permit operation of the laser generator in a temperature range between about $-30°$ C. and $+70°$ C., while active media containing no thionyl chloride permit operation of the laser generator only between about $10°$ C. and $90°$ C.

What is claimed is:

1. In liquid laser active medium comprising a doping agent in solution in a solvent, the improvement wherein said solvent comprises a mixture of the following products: thionyl chloride, antimony chloride and at least one hydrolysis product thereof.

2. The liquid laser active medium according to claim 1, wherein: said mixture contains in addition, titanium chloride.

3. The laser generator according to claim 1, wherein: said mixture is obtained by mixing thionyl chloride, antimony chloride and water.

4. The laser generator according to claim 3, wherein: said mixture is prepared in the following proportions by volume, substantially 65% of antimony chloride to 35% of thionyl chloride, with a water concentration of 0.6 mole per litre.

5. The laser generator according to claim 2, wherein: said mixture contains in proportions by volume, 60% of antimony chloride, 35% of thionyl chloride and 5% of titanium chloride, with a water concentration of 0.6 mole per litre.

6. The laser generator according to claim 3, wherein: said mixture contains in proportions by volume, 60% of antimony chloride, 35% of thionyl chloride and 5% of titanium chloride, with a water concentration of 0.6 mole per litre.

References Cited

UNITED STATES PATENTS 3,631,361  12/1971  Blumenthal _____ 331—94.5

OTHER REFERENCES

Weichsel Gartner et al., Z. Naturforschung, vol. 25a, August-September '70, pp. 1244–7.

RONALD L. WIBERT, Primary Examiner

R. J. WEBSTER, Assistant Examiner

U.S. Cl. X.R.

252—301.4